Figure 1:
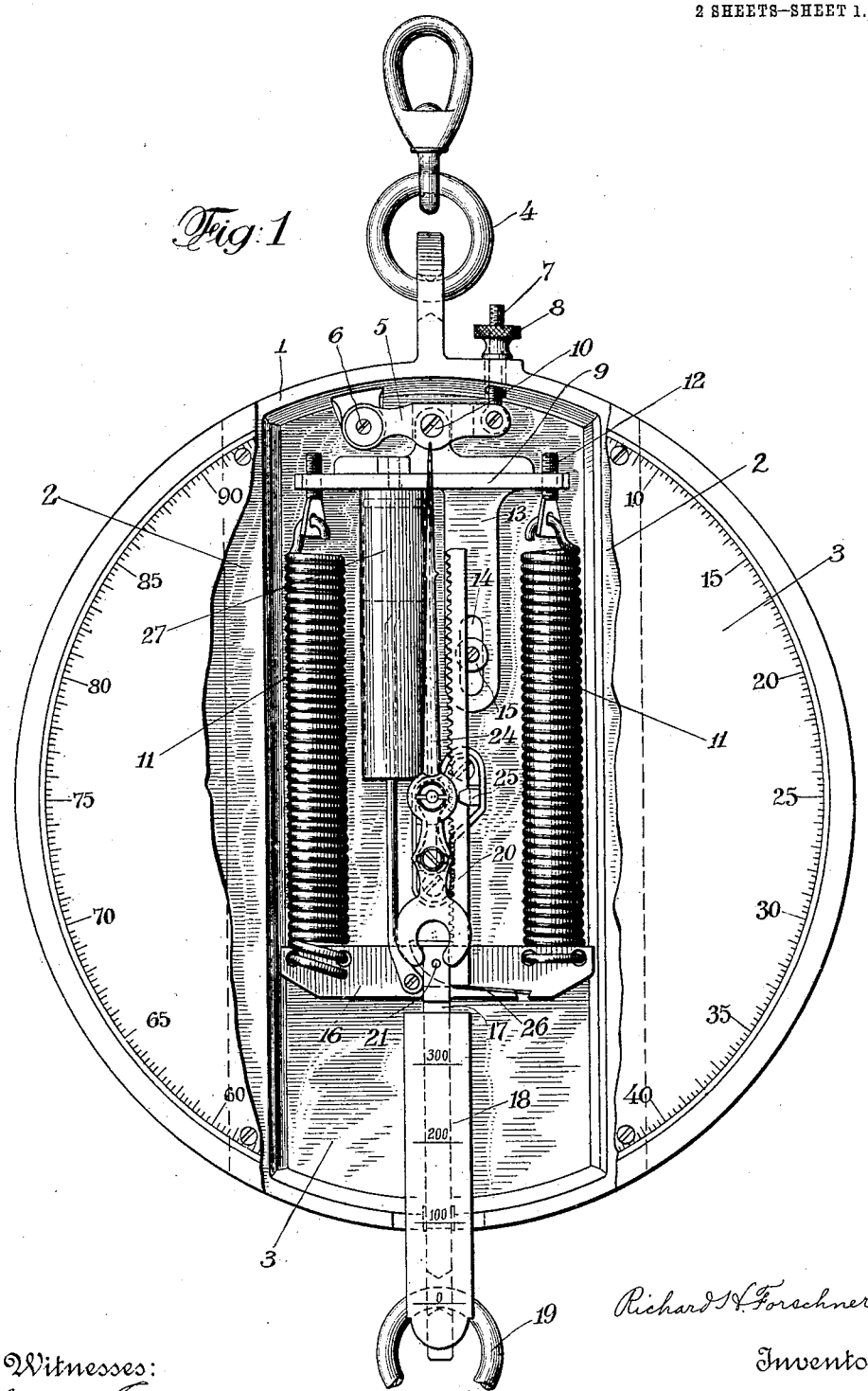

R. H. FORSCHNER.
SCALE.
APPLICATION FILED JAN. 19, 1910.

972,443.

Patented Oct. 11, 1910.
2 SHEETS—SHEET 1.

Witnesses:
John O. Gamber
E. J. Rooney

Richard H. Forschner,
Inventor,
By his Attorneys,
Kenyon & Kenyon

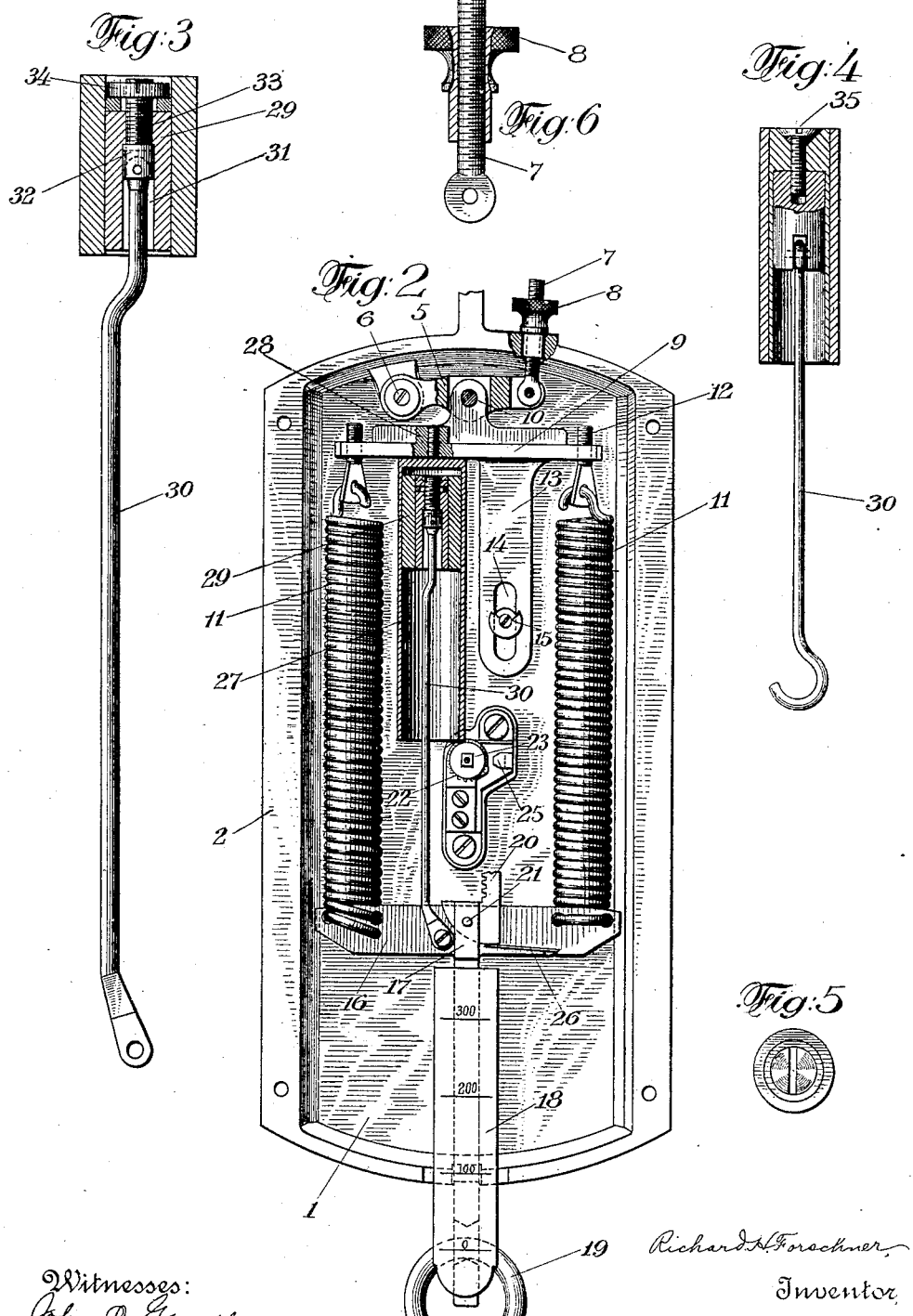

UNITED STATES PATENT OFFICE.

RICHARD H. FORSCHNER, OF NEW YORK, N. Y.

SCALE.

972,443.
Specification of Letters Patent.
Patented Oct. 11, 1910.

Application filed January 19, 1910. Serial No. 538,832.

*To all whom it may concern:*

Be it known that I, RICHARD H. FORSCHNER, a citizen of the United States, and a resident of the city, county, and State of New York, have invented certain new and useful Improvements in Scales, of which the following is a specification.

My invention relates to scales and more particularly, in some of its features, to spring balance scales or other automatic counterbalancing scales.

The object of my invention is to provide a scale which can be cheaply constructed and easily taken apart for repairs and in which the pointer may be readily adjusted at any time and the movement thereof made steady, even and reliable without undue friction.

My invention will best be understood by reference to the following description taken in connection with the accompanying drawings forming a part of this specification in which—

Figure 1 is a front view of the scale with a part of the dial broken away to show the mechanism, Fig. 2 is a front view of the frame of the scale with the dial removed and certain of the parts in section and others partly broken away to show certain details, and Figs. 3, 4, 5 and 6 show details of the mechanism.

Referring to the drawings—Fig. 1—1 is a channel-like frame having lateral flanges 2, to which is secured a dial 3, the frame being suspended from any suitable means such as the hook and link 4. A supporting arm 5 is pivoted to the frame at 6, preferably upon a lug formed on the frame, and at the other end of this arm is pivoted a threaded rod 7 which passes through an opening in the frame and is provided with a nut 8 for adjusting the arm vertically on its pivot. A bar 9 is pivoted to the supporting arm preferably in the line of suspension, as at 10, and at each end of this arm a spring 11 is suspended by means of screw threaded studs 12, which allow compensation for any slight lack of adjustment in the springs themselves, and extending down between the springs from the bar 9 is a projection 13 provided with a slot 14 into which a projection 15 from the frame engages for the purpose of guiding the spring carrying arm 9 and holding it normal to the line of draft for the adjusted positions of supporting arm 5 and for other purposes hereinafter mentioned. A load bar 16 is secured to the lower end of the springs 11, said bar having an extension 17 to which is secured a scale 18 and means such as 19 for accommodating the load. A rack bar 20 is pivoted to the load bar at 21 and engages a pinion 22 mounted on a shaft 23 to which is also secured a pointer 24. The rack bar is guided in its reciprocations and held to engagement with the pinion by means of a guide lug 25 mounted on the frame opposite the pinion and a spring 26 secured to the load bar 16.

For the purpose of dampening the movement of the load bar so as to give the pointer an even travel over the dial I provide a dash pot consisting of an inverted open-mouthed cylinder 27 which is rigidly secured to the spring carrying arm 9 by means of a screw threaded projection 28 (Fig. 2), and a piston 29 which is movable in the cylinder and connected to the load bar 16 by means of a rod 30.

Great difficulty has been encountered in providing scales with a dash pot that while giving the pointer an even travel over the dial and eliminating unnecessary vibrations, will not create too great a friction or have a tendency to bind under certain operating conditions; and to overcome these difficulties I mount the cylinder of my dash pot on the arm 9 and connect the piston with the load arm in the following manner. The piston 29 is provided with the longitudinal central opening 31 (Fig. 3) into which fits a plug 32 having a threaded extension 33 engaging a nut 34 counter-sunk in the top of the piston, and to the stud 32 I pivot the rod 30 which at its other end is preferably rigidly connected to the load arm 16. By this construction the thrust of the rod is transmitted directly to the center of the dashpot so that all lateral thrusts on the piston due to relative lateral movement between the two bars 9 and 16 will cause the smallest possible amount of side thrust or tendency to bind between the piston and cylinder, since the pull and thrust of the rod 30 is transmitted directly to the center of the length of the piston. By this construction I can readily replace worn or cracked pistons simply by unscrewing the nut from the threads of the plug and inserting the plug in a new piston, and also by the use of the threaded extension of the plug and the nut I am enabled to adjust the plug within the longitudinal opening of the piston so as to bring the pivotal connection between the piston and plug substantially at the center of the piston with pistons of slightly varying length, all of which adds to the economy and adjustment of the scale.

In Figs. 4 and 5 I show a slight modification in the connection between the plug and the central opening of the piston in which the plug is tapped out and held in place by a counter-sunk screw 35 at the top of the piston, the plug fitting the opening of the piston throughout its length.

Fig. 6 shows an enlarged view of the threaded rod and the nut engaging the same for adjusting the supporting arm 5 upon its pivot. Obviously many other arrangements for making this adjustment may be provided, and while I have described my invention with particularity in the form shown, I do not wish to be understood as limiting myself to the details of the particular construction shown since various modifications may be made in the invention without departing from the spirit of the same.

I consider the feature of guiding and holding the bar 19 normal to the line of draft, an important feature of my invention since it has many advantages over scales in which this bar is permitted to rock on its pivot. By holding this bar normal to the line of draft, and preventing rocking, the springs are made to receive the load more uniformly in a shorter length of time, thus making the indicating mechanism more steady during the weighing operations, and especially is this true in cases where the load is taken off and put on rapidly, since the pointer becomes steady in a much shorter length of time than if the arm 9 were permitted to rock on its pivot due to the movements of the springs. Again where, for certain reasons, it is preferable to secure the dashpot on this bar 9 as applicant has done, the guiding of said bar reduces the tendency of the dashpot and cylinder to bind due to the increased relative motion between said bars if both were permitted to have lateral movement. This feature of guiding the bar 9 is also of importance in the testing or graduating of the scale, since it permits this operation to be done in a much shorter time, thereby reducing the cost of production.

Before a scale is put on the market it should be properly graduated so that the pointer will register at the proper point of the dial for a given standard weight, and to do this it is necessary to adjust the teeth or other gearing connecting the load bar with the pointer, and since the pointer must come to a position of rest at each division of the scale before its accuracy can be determined, any lessening of the vibration of the pointer due to the spring action, will greatly reduce the time taken for calibrating or graduating each scale, and by holding the bar 9 normal to the line of draft the vibration of the spring, and hence of the pointer, is greatly reduced, and the time required for calibrating or graduating greatly reduced. Obviously various arrangements may be devised for guiding the bar 9, and I do not wish to be understood as limiting myself to the construction shown other than as indicated in the appended claims.

Having thus described my invention, what I claim as new and desire to secure by Letters Patent, is:

1. In a scale, the combination of a frame, a supporting arm pivoted thereto, a spring carrying bar pivoted to said arm, a load bar, springs connecting said bars, means for adjusting the supporting arm vertically, and means for holding the spring carrying bar at right angles to the line of draft.

2. In a scale, the combination of a frame, a supporting arm pivoted thereto, a spring carrying bar pivoted to said arm, a load bar, springs connecting said bars, means at the other end of said supporting arm engaging a part of the frame for adjusting said arm in a vertical plane, a projection from the frame a projection from the carrying arm extending between the springs and engaging the projection from the frame for guiding said bar and holding it parallel to the load bar at all positions of said supporting arm.

3. In a scale, the combination of a frame, means for suspending the same, a load supporting arm pivoted to the frame at one side of the line of suspension, a spring carrying bar pivoted to said arm substantially in the line of suspension, a pair of springs suspended from said bar one at each end, a load bar carried on the lower end of said springs, means projecting from the supporting arm and engaging a part of the frame for adjusting said arm, a projection from the bar provided with a slot extending down between the springs, and a stud from the frame engaging in said slot for guiding said carrying bar and holding it normal to the line of suspension for the adjusted positions of the supporting arm.

4. In a scale, the combination of a frame, having a vertical channel portion, means for suspending the frame, a load supporting arm pivoted to said frame at the top of the channel and to one side of the line of suspension, a spring carrying bar within the channel pivoted to said arm substantially in the line of suspension, a stud at each end of the bar having a screw threaded connection therewith, a pair of parallel springs, one being suspended from each stud, a load bar also within the channel and suspended at the lower end of said springs, a threaded rod pivoted to the supporting arm, a nut supported by the frame and engaging the threads of said rod for adjusting the arm vertically on its pivot, a projection from the carrying bar extending down between the springs and provided with a slot, a projection from the frame engaging in said slot to guide said bar and hold it normal to the line of suspension for all positions of said supporting arm.

5. In a scale, the combination of a frame, means for supporting the same, a supporting arm pivoted to the frame, a spring carrying bar pivoted to said arm substantially in the line of suspension, a spring secured at each end of said bar, a load bar carried at the lower end of said springs, a dash pot having two relatively movable members for dampening the movement of said load bar, one member being connected to said carrying bar intermediate the spring connections therewith, the other member being connected to the load bar, and means for holding the carrying bar normal to the line of suspension to prevent binding of the dash pot.

6. In a scale, the combination of a frame, a supporting arm pivoted to the frame, means for adjusting said arm vertically about its pivot, a spring carrying bar pivoted to said arm intermediate its points of support, a spring carried at each end of said bar, a load bar carried at the lower end of said springs, a cylinder mounted on the carrying bar and extending between the springs, a piston movable in said cylinder, a rod connected to the load bar at one end and at the other end pivoted to the piston, substantially at the center of the longitudinal axis of its friction surface, and means for guiding the carrying bar and holding it normal to the line of draft for preventing binding of said cylinder and piston.

7. In a scale, the combination of a frame, a supporting arm pivoted to said frame at one end, and means secured to the other end of said arm and engaging said frame for vertically adjusting said arm on its pivot, a spring carrying bar pivotally connected to said arm intermediate its supports, a spring suspended from each end of said bar, a slotted member projecting down from said bar between the springs, a stud projecting from the frame and engaging in said slot to guide the bar and hold it normal to the line of draft, a shaft carried by said frame intermediate the springs, a pointer and a pinion secured to said shaft, a dial over which said pointer moves, a load bar carried at the lower end of said springs, a rock bar pivoted to said load bar and means for guiding the same and holding it in engagement with said pinion for moving the pointer, a cylinder mounted on the carrying bar and a piston movable in said cylinder and connected to said load bar, whereby the supporting arm, bars, springs and dash pot may be removed from said frame intact by removing the dial and loosening the supporting arm from its supports and disengaging the stud from the slotted member of the carrying bar.

8. In a scale, the combination of a frame, a supporting arm pivoted thereto, means for adjusting said arm vertically on its support, a spring carrying bar pivoted to said arm, a load bar, springs connecting said bars, a cylinder rigidly secured to the spring carrying bar, a dash pot movable in said cylinder, a rod secured to the load bar at one end and at its other end pivoted to said piston substantially at the center of the longitudinal axis of its friction surface, and means projecting from the spring carrying bar and engaging a part on the frame for holding the bar normal to the line of draft for equally distributing the load on the springs.

In testimony whereof, I have signed my name to this specification, in the presence of two subscribing witnesses.

RICHARD H. FORSCHNER.

Witnesses:
SAMUEL M. WARD, Jr.,
EDWIN SEGER.